United States Patent
Nakano et al.

(10) Patent No.: US 8,566,097 B2
(45) Date of Patent: Oct. 22, 2013

(54) LEXICAL ACQUISITION APPARATUS, MULTI DIALOGUE BEHAVIOR SYSTEM, AND LEXICAL ACQUISITION PROGRAM

(75) Inventors: Mikio Nakano, Saitama (JP); Takashi Nose, Kanagawa (JP); Ryo Taguchi, Aichi (JP); Kotaro Funakoshi, Saitama (JP); Naoto Iwahashi, Kyoto (JP)

(73) Assignees: Honda Motor Co., Ltd., Tokyo (JP); Advanced Telecommunications Research Institute International, Kyoto (JP)

( * ) Notice: Subject to any disclaimer, the term of this patent is extended or adjusted under 35 U.S.C. 154(b) by 648 days.

(21) Appl. No.: 12/791,781

(22) Filed: Jun. 1, 2010

(65) Prior Publication Data
US 2010/0332231 A1 Dec. 30, 2010

Related U.S. Application Data

(60) Provisional application No. 61/183,550, filed on Jun. 2, 2009.

(51) Int. Cl.
*G10L 15/00* (2013.01)

(52) U.S. Cl.
USPC ........... 704/254; 704/246; 704/247; 704/251; 704/252

(58) Field of Classification Search
None
See application file for complete search history.

(56) References Cited

U.S. PATENT DOCUMENTS

| | | | | |
|---|---|---|---|---|
| 5,390,278 A | * | 2/1995 | Gupta et al. | 704/243 |
| 6,041,299 A | * | 3/2000 | Schuster et al. | 704/232 |
| 2004/0215463 A1 | | 10/2004 | Aoyama et al. | |

(Continued)

FOREIGN PATENT DOCUMENTS

| JP | 2003-255989 A | 9/2003 |
|---|---|---|
| JP | 2004-252111 A | 9/2004 |
| JP | 2007-021719 A | 2/2007 |

OTHER PUBLICATIONS

Roy, "Integration of Speech and Vision Using Mutual Information", in Proc. ICASSP-2000, 2000, pp. 2369-2372 Mentioned on pp. 1 and 2 of as-filed specification.

(Continued)

*Primary Examiner* — Leonard Saint Cyr
(74) *Attorney, Agent, or Firm* — Chen Yoshimura LLP (57) ABSTRACT

A lexical acquisition apparatus includes: a phoneme recognition section 2 for preparing a phoneme sequence candidate from an inputted speech; a word matching section 3 for preparing a plurality of word sequences based on the phoneme sequence candidate; a discrimination section 4 for selecting, from among a plurality of word sequences, a word sequence having a high likelihood in a recognition result; an acquisition section 5 for acquiring a new word based on the word sequence selected by the discrimination section 4; a teaching word list 4A used to teach a name; and a probability model 4B of the teaching word and an unknown word, wherein the discrimination section 4 calculates, for each word sequence, a first evaluation value showing how much words in the word sequence correspond to teaching words in the list 4A and a second evaluation value showing a probability at which the words in the word sequence are adjacent to one another and selects a word sequence for which a sum of the first evaluation value and the second evaluation value is maximum, and wherein the acquisition section 5 acquires, as a new word, a word in the word sequence selected by the discrimination section that is not involved in the calculation of the first evaluation value.

8 Claims, 8 Drawing Sheets

(56) References Cited

U.S. PATENT DOCUMENTS

| | | | |
|---|---|---|---|
| 2005/0004710 | A1 | 1/2005 | Shimomura et al. |
| 2006/0212296 | A1* | 9/2006 | Espy-Wilson et al. ........ 704/254 |
| 2008/0133239 | A1* | 6/2008 | Jeon et al. ................ 704/254 |
| 2008/0300870 | A1* | 12/2008 | Hsu et al. ................. 704/231 |
| 2009/0150153 | A1* | 6/2009 | Li et al. .................. 704/254 |

OTHER PUBLICATIONS

Yu et al., "On the Integration of Grounding Language and Learning Objects", in Proc. 19th AAAI, 2004, pp. 488-494 Mentioned on pp. 1 and 2 of as-filed specification.

Nakano et al., "A Framework for Building Conversational Agents Based on a Multi-Expert Model", in Proc. 9th SIGdial Workshop, 2008, pp. 88-91 Mentioned on pp. 2, 16 and 17 of as-filed specification.

Holzapfel et al., "A dialogue approach to learning object descriptions and semantic categories", Robotics and Autonomous Systems, 2008, vol. 56, No. 11, pp. 1004-1013 Mentioned on pp. 2, 17 and 21of as-filed specification.

O'Neill et al., "Object-oriented modelling of spoken language dialogue systems", Natural Language Engineering, 2001, vol. 6, No. 3&4, pp. 341-362 Mentioned on pp. 2 and 17 of as-filed specification.

Funakoshi et al., "Robust acquisition and recognition of spoken location names by domestic robots", in Proc. IROS-2007, Oct. 29-Nov. 2, 2007, pp. 1435-1440 Mentioned on pp. 2, 19 and 21 of as-filed specification.

Torii et al., "Hito-robot interaction system notameno middleware no kaihatsu, Middleware for Human-Robot Interaction system", The Society of Instrument and Control Engineers, 7th system integration section lecture meeting (SI2006), 2006, pp. 2D2-1 Mentioned on pp. 2 and 20 of as-filed specification and English Abstract included as a concise explanation of relevance.

Nakano et al., "Object shikou ni motozuku robot agent no. multi domain taiwa koudou seigyo module kouchiku tool RIME-TK, RIME-TK: A Toolkit for Developing Multi-Domain Dialogue and Behavior Controller of Robots and Agents Based on the Object-Oriented Framework", The Japanese Society for Artificial Intelligence document SIG-SLUD-54, 2008 Mentioned on pp. 2 and 20 of as-filed specification and English Abstract included as a concise explanation of relevance.

Kawahara et al., "Recent progress of open-source LVCSR engine Julius and Japanese model repository", in Proc. Interspeech—2004 (ICSLP), 2004, pp. 3069-3072 Mentioned on pp. 2, 20 and 21 of as-filed specification.

Yamamoto et al., "Fukusuu no Markov model wo mochiita kaisouka gengo model niyoru mitourokugo ninshiki, Out-of-Vocabulary Word Recognition with a Hierarchical Language Model Using Multiple Markov Model", Journal of the Institute of Electronics, Information and Communication Engineers D-II, 2004, vol. J87-D-2, No. 12, pp. 2104-2111 Mentioned on pp. 2, 21 and 22 of as-filed specification as a concise explanation of relevance.

Taguchi et al., "Model sentaku niyoru gengo kakutoku syuhou to sono hyouka, Proposal and Evaluation of a Language Acquisition Method Based on Model Selection", Collection of Papers of Lectures in 23th National Convention of The Japanese Society for Artificial Intelligence, 2009 Mentioned on pp. 2 and 21 of as-filed specification and English Abstract included as a concise explanation of relevance.

Sakoe, "Two-level DP-matching—A dynamic programming-based pattern matching algorithm for connected word recognition", IEEE Transactions on Acoustics, Speech and Signal Processing, Dec. 1979, vol. 27, No. 6, pp. 588-595 Mentioned on pp. 2, 3, 8 and 22 of as-filed specification.

\* cited by examiner

--------- the sentence candidate with
maximum likelihood

A Word Graph for Utterence kore ga umi dayo
("This is the sea" in English)

LEXICAL ACQUISITION APPARATUS, MULTI DIALOGUE BEHAVIOR SYSTEM, AND LEXICAL ACQUISITION PROGRAM

This application claims the benefit of Provisional Application of Ser. No. 61/183,550, filed on Jun. 2, 2009.

TECHNICAL FIELD

The present invention relates to a speech recognition processing apparatus. In particular, the present invention relates to a lexical acquisition apparatus, a multi dialogue behavior system, and a lexical acquisition program that can learn a new name from among natural dialogues.

BACKGROUND ART

In recent years, research has been actively made on robots and animation agents having a speech dialogue function for example. Speech dialogue requires speech recognition. However, the current speech recognition technique can recognize only words and phrases that are registered in advance. This results in an inconvenience when the robots are actually used at home or office for example.

At home and office for example, particular words are used and new words come into existence every day. For example, when a new article is bought by a certain family, the article is frequently named to have a name that is unique to the family. If it is required to verbally instruct a robot to perform a task to find such an article at home, the robot cannot understand the instruction unless the robot knows the word showing the name of the article. An approach may be considered to register a new word by an input to a keyboard. However, this is burdensome. Therefore, robots are desired to have a capability to learn a new name by a speech communication.

Conventionally, many researches have been made on a system for learning the names of objects. However, most of the resultant systems are specialized in a task to learn names by statistically acquiring the names through a set of a plurality of uttelances (Patent Literatures 1 to 3, Non-Patent Literatures 1 and 2).

CITATION LIST

Patent Document

[Patent Literature 1] Japanese Patent No. 3529049
[Patent Literature 2] Japanese Patent No. 3951235
[Patent Literature 3] Japanese Unexamined Patent Application Publication No. 2007-021719

Non-Patent Literature

[Non-Patent Literature 1] Roy, D.: Integration of Speech and Vision Using Mutual Information, in Proc. ICASSP-2000, pp. 2369-2372 (2000)
[Non-Patent Literature 2] Yu, C. and Ballard, D.: On the Integration of Grounding Language and Learning Objects, in Proc. 19th AAAI (488-494)
[Non-Patent Literature 3] Nakano, M., Funakoshi, K., Hasegawa, Y, and Tsujino, H.: A Framework for Building Conversational Agents Based on a Multi-Expert Model, in Proc. 9th SIGdial Workshop, pp. 88-91 (2008)
[Non-Patent Literature 4] Holzapfel, H., Neubig, D., and Waibel, A.: A dialogue approach to learning object descriptions and semantic categories, Robotics and Autonomous Systems, Vol. 56, No. 11, pp. 1004-1013 (2008)
[Non-Patent Literature 5] O'Neill, I. M. and McTear, M. E: Object-oriented modelling of spoken language dialogue systems, Natural Language Engineering, Vol. 6, No. 3 & 4, pp. 341-362 (2001)
[Non-Patent Literature 6] Funakoshi, K, Nakano, M., Torii, T., Hasegawa, Y, Tsujino, H., Kimura, N., and Iwahashi, N.: Robust acquisition and recognition of spoken location names by domestic robots, in Proc. IROS-2007, pp. 1435-1440 (2007)
[Non-Patent Literature 7] Torii Toyotaka, Hasegawa Yuuji, Nakano Mikio, Nakadai Kazuhiro, Tsujino Hiroshi: Hito-robot interaction system notameno middleware no kaihatsu, The Society of Instrument and Control Engineers, $7^{th}$ system integration section lecture meeting (SI2006), pp. 2D2-1 (2006)
[Non-Patent Literature 8] Nakano Mikio, Funakoshi Kotaro, Hasegawa Yuuzi, Tsujino Hiroshi: Object shikou ni motozuku robot agent no multi domain taiwa koudou seigyo module kouchiku tool RIME-TK, The Japanese Society for Artificial Intelligence document SIG-SLUD-54 (2008)
[Non-Patent LiteraturePatent Document 9] Kawahara, T., Lee, A., Takeda, K, Itou, K., and Shikano, K.: Recent progress of open-source LVCSR engine Julius and Japanese model repository, in Proc. Interspeech-2004 (ICSLP), pp. 3069-3072 (2004)
[Non-Patent Literature 10] Yamamoto Hiroshi, Kokubo Hiroaki, Kikui Genichirou, Ogawa Yoshihiko, Sakisaka Yoshinori: Fukusuu no Markov model wo mochiita kaisouka gengo model niyoru mitourokugo ninshiki, Journal of The Institute of Electronics, Information and Communication Engineers D-II, Vol. J87-D-2, No. 12, pp. 2104-2111 (2004)
[Non-Patent Literature 11] Taguchi Ryo, Iwahashi Naoto, Nose Takashi, Funakoshi Kotaro, Nakano Mikio: Model sentaku niyoru gengo kakutoku syuhou to sono hyouka, Collection of Papers of Lectures in 23th National Convention of The Japanese Society for Artificial Intelligence (2009)
[Non-Patent Literature 12] Sakoe, H.: Two-level DP-matching—A dynamic programming-based pattern matching algorithm for connected word recognition, IEEE Trans. on Acoustics, Speech and Signal Processing, Vol. 27, No. 6, pp. 588-595 (1979)

SUMMARY OF THE INVENTION

Technical Problem

However, when considering a scene when a domestic robot is actually used, it is required to detect a speech that teaches a name in a natural spoken dialogue to extract the name of an object in the speech to link the name to the object The present invention has been made in view of the above. It is an objective of the present invention to provide a lexical acquisition apparatus, a multi dialogue behavior system, and a lexical acquisition program for learning a new name through natural spoken dialogue.

Solution to Problem

In order to achieve the above objective, a lexical acquisition apparatus of the present invention is characterized in including: a phoneme recognition section for preparing a phoneme sequence candidate from an inputted speech, a word matching section for preparing a plurality of word sequences based on the phoneme sequence candidate, a discrimination section for selecting, from among a plurality of word sequences, a word sequence having a high likelihood in a recognition result, an acquisition section for acquiring a new word based on the word sequence selected by the discrimination section, a teaching word list used to teach a name, and a probability model of the teaching word and an unknown word. The discrimination section calculates, for each the word sequence, a first evaluation value showing how much words in the word sequence correspond to teaching words in the list and a second evaluation value showing a probability at which the words in the word sequence are adjacent to one another and selects a word sequence for which a sum of the first evaluation value and the second evaluation value is maximum. The acquisition section acquires, as a new word, a word in the word sequence selected by the discrimination section that is not involved in the calculation of the first evaluation value.

The lexical acquisition apparatus of the present invention preferably includes a speech recognition section for recognizing the inputted speech and a speech comprehension section for comprehending contents of the speech subjected to the speech recognition by the speech recognition section. When the speech comprehension section recognizes that the speech contents teach a name, a word acquisition processing is performed.

The lexical acquisition apparatus of the present invention preferably further includes a teaching phrase extraction section for cutting, from a speech from a user, a speech corresponding to a teaching phrase. The phoneme recognition section prepares the phoneme sequence candidate based on the speech from the teaching phrase extraction section.

In order to achieve the above objective, the multi dialogue behavior system of the present invention includes: a speech recognition section for recognizing an inputted speech, a speech comprehension section for comprehending contents of the speech subjected to the speech recognition by the speech recognition section, and a plurality of functional sections for performing various types of dialogue behaviors based on the speech comprehension result. The functional section includes a lexical acquisition apparatus for performing a word acquisition processing when the speech comprehension section recognizes that the speech contents teach a name. The lexical acquisition apparatus includes: a phoneme recognition section for preparing a phoneme sequence candidate from an inputted speech, a word matching section for preparing a plurality of word sequences based on the phoneme sequence candidate, a discrimination section for selecting, from among a plurality of word sequences, a word sequence having a high likelihood in a recognition result, an acquisition section for acquiring a new word based on the word sequence selected by the discrimination section, a teaching word list used to teach a name, and a probability model of the teaching word and an unknown word. The discrimination section calculates, for each the word sequence, a first evaluation value showing how much words in the word sequence correspond to teaching words in the list and a second evaluation value showing a probability at which the words in the word sequence are adjacent to one another and selects a word sequence for which a sum of the first evaluation value and the second evaluation value is maximum. The acquisition section acquires, as a new word, a word in the word sequence selected by the discrimination section that is not involved in the calculation of the first evaluation value.

The multi dialogue behavior system of the present invention preferably further includes a teaching phrase extraction section for cutting, from a speech from a user, a speech corresponding to a teaching phrase. The phoneme recognition section prepares the phoneme sequence candidate based on the speech from the teaching phrase extraction section.

In order to achieve the above objective, the lexical acquisition program of the present invention causes a computer to function as: a phoneme recognition section for preparing a phoneme sequence candidate from an inputted speech, a word matching section for preparing a plurality of word sequences based on the phoneme sequence candidate, a discrimination section for selecting, from among a plurality of word sequences, a word sequence having a high likelihood in a recognition result, and an acquisition section for acquiring a new word based on the word sequence selected by the discrimination section. The discrimination section calculates, for each the word sequence, a first evaluation value showing how much words in the word sequence correspond to teaching words in a teaching word list used to teach a name and a second evaluation value showing a probability at which the words in the word sequence are adjacent to one another and selects a word sequence for which a sum of the first evaluation value and the second evaluation value is maximum. The acquisition section acquires, as a new word, a word in the word sequence selected by the discrimination section that is not involved in the calculation of the first evaluation value.

The lexical acquisition program of the present invention preferably further causes the computer to function as: a speech recognition section for recognizing the inputted speech, and a speech comprehension section for comprehending contents of the speech subjected to the speech recognition by the speech recognition section. When the speech comprehension section recognizes that the speech contents teach a name, a word acquisition processing is performed.

The lexical acquisition program of the present invention preferably further causes the computer to function as: a teaching phrase extraction section for cutting, from a speech from a user, a speech corresponding to a teaching phrase. The phoneme recognition section prepares the phoneme sequence candidate based on the speech from the teaching phrase extraction section.

Advantageous Effects of Invention

According to the present invention, a new name can be learned from spontaneous speech of a human, namely natural dialogue.

DESCRIPTION OF EMBODIMENTS

Figure 1:
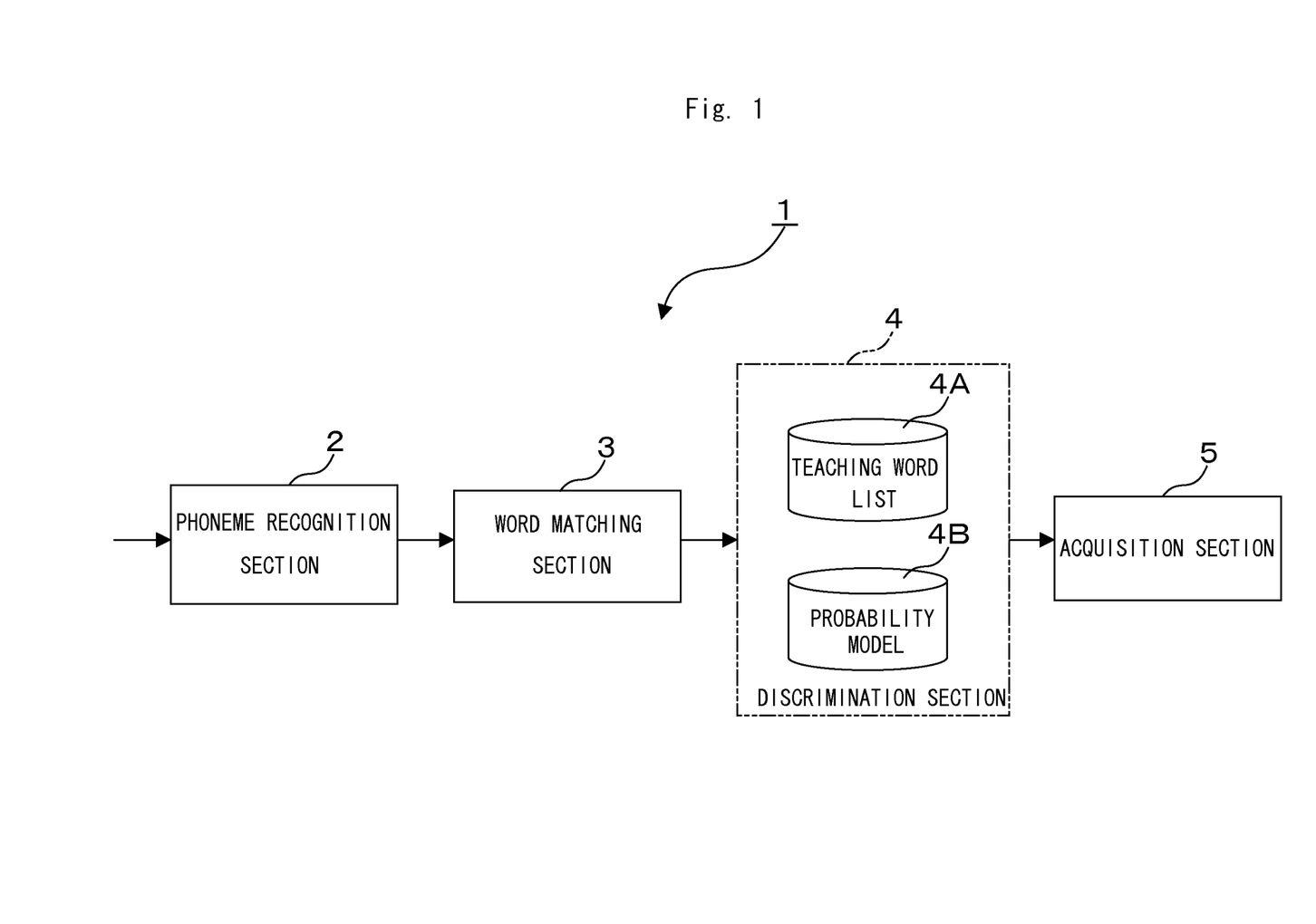
FIG. 1 is a block diagram illustrating the configuration of a lexical acquisition apparatus according to the present embodiment.

The following section will describe an embodiment of the present invention by describing in detail the following items with reference to the drawings if required.
A. Outline: Regarding "lexical acquisition apparatus"
B. Configuration of "lexical acquisition apparatus"
B-1. "Phoneme recognition section"
B-2. "Word matching section"
B-3. "Discrimination section"
B-4. "Acquisition section"
B-5. "Other configurations of lexical acquisition apparatus"
C. "Operation of lexical acquisition apparatus"
D. "Effect of lexical acquisition apparatus"
E. "Multi dialogue behavior system according to other embodiments"
E-1. "Speech recognition section"
E-2. "Domain selecting section"
E-3. "Domain"
E-4. "Confirmation speech generating section"
E-5. "Behavior execution section"
E-6. "Action of multi dialogue behavior system according to other embodiments"
E-7. "Effect of multi dialogue behavior system according to other embodiments"
F. "Illustrative embodiment"
F-1. "Task of suggested architecture"
F-2. "Lexical acquisition dialogue robot architecture"
F-2-1. "Multi expert model RIME"
F-2-2. "Outline of architecture"
F-2-3. "Expert selection"
F-2-4. "The lexical acquisition dialogue expert"
F-2-5. "The object search expert"
F-2-6. "The expert answering a name of an object"
F-3. "Implementation"
F-3-1. "Robot"
F-3-2. "Dialogue behavior control"
F-3-3. "Lexical acquisition"
F-3-4. "Image study and recognition"
G: Others
A. Outline: Regarding "Lexical Acquisition Apparatus"
A lexical acquisition apparatus according to an embodiment of the present invention studies a word from a utterance of a user. In particular, the lexical acquisition apparatus automatically studies, without switching the system status to a study mode depending on an instruction from the user, a word (i.e., an unknown word) in a conversation. The term "word" herein means the name of an article, place, or person.
B. Configuration of "Lexical Acquisition Apparatus"
FIG. 1 is a block diagram illustrating the configuration of a lexical acquisition apparatus 1 according to the present embodiment. The lexical acquisition apparatus 1 includes: a phoneme recognition section 2; a word matching section 3; a discrimination section 4; and an acquisition section 5.

Next, the following section will describe the respective functions of the phoneme recognition section 2, the word matching section 3, the discrimination section 4, and the acquisition section 5.
B-1. "Phoneme Recognition Section"
The phoneme recognition section 2 prepares phoneme sequence candidates based on an inputted speech. This phoneme recognition section 2 recognizes phonemes of the speech based on a statistical model of Japanese phoneme for example. Although not shown, the phoneme models are provided in advance in the lexical acquisition apparatus 1.

When the user uttered a speech of "Korega Petto Botoru Dayo" ("This is a plastic bottle." in English), then the phoneme recognition section 2 prepares a phoneme recognition candidate such as "korebabedobotorudajyo".
B-2. "Word Matching Section"
The word matching section 3 prepares, based on the phoneme recognition candidate recognized by the phoneme recognition section 2, a plurality of word sequences (e.g., N word sequences).

For example, based on the above-described phoneme recognition candidate "korebabedobotorudajyo", word sequences as shown in the following table 1 are prepared.

TABLE 1

| Word sequence number | Contents |
|---|---|
| 1 | Korewa/bettobo/dayo |
| 2 | Korewa/botoru/dayo |
| 3 | Korewa/betobodoru/dayo |
| . | . |
| . | . |
| . | . |
| N | Korega/betoboto/dajyo |

The word matching section 3 carries out the following two processings A and B.

[Processing A] The word matching section 3 calculates the distances between all partial sequences of the phoneme recognition result and the respective words. Specifically, the word matching section 3 calculates the similarities (i.e., distances) between the word included therein in advance and the respective sequence parts in the phoneme sequences obtained as the phoneme recognition result. Any combination (i.e., sequence part) for which a calculated distance is longer than a threshold value is excluded. As a method of calculating this distance, a dynamic programming can be used [Non-Patent Literature 12].

[Processing B] The word matching section 3 memorizes, with regards to the phoneme sequences as the phoneme recognition result, any part(s) of the phoneme sequences that are considered to be a Japanese word candidate as an unknown word candidate. Specifically, the word matching section 3 memorizes all sequence parts for which the distance is determined to be equal to or lower than the threshold value in the above processing A (i.e., sequence parts not excluded in the processing A).
B-3. "Discrimination Section"
The discrimination section 4 selects, from among a plurality of word sequences, a speech recognition result of a word sequence having the maximum likelihood. The discrimination section 4 includes therein a list 4A of expressions other than names such as "korewa, . . . dayo", "korega, . . . desu", and "korega, . . . dayo". These three expressions mean "This is . . . " in English. These expressions include words used by the user to teach a name. Thus, these expressions will be called a "teaching word".

In a speech including a teaching word such as "korewa, . . . dayo", "korega, . . . desu", and "korega, . . . dayo", a speech recognition candidate positioned at the " . . . " is assumed as an unknown word.

For convenience of description, in a word sequence recognized by the word matching section 3, a part related to a teaching word is called a teaching part and a part related to an unknown word is called an unknown word part.

Furthermore, the discrimination section 4 includes a probability model 4B between a teaching word and an unknown word. This probability model 4B shows a probability at which two words of a teaching word and an unknown word occurs continuously. When assuming that a teaching word is W1 and an unknown word is W2 for example, the discrimination section 4 includes the probability model 4B shown in the following table 2.

TABLE 2

| W1 | W2 | Probability |
|---|---|---|
| korewa | <name of article> | 0.8 |
| korega | <name of article> | 0.7 |
| . | . | . |
| . | . | . |
| . | . | . |
| korega | desune | 0.2 |

Although the above table 2 shows teaching words and unknown words separately, the probability model 4B is prepared in an actual case that does not separate teaching words from unknown words and that includes teaching words and unknown words collectively. Unknown words are collectively handled as <name of article> depending on the class of an unknown word.

The discrimination section 4 of this embodiment carries out the following two evaluations.
(Evaluation 1) Similarity between a part matching a teaching word in a phoneme recognition result and the teaching word [first evaluation value]
(Evaluation 2) Occurrence probability of word sequence [second evaluation value]

For each word sequence, the comprehensive evaluation of the evaluation 1 and the evaluation 2 (i.e., the sum of the first evaluation value and the second evaluation value) is calculated. The comprehensive evaluation can be expressed by the following formula 1.

Comprehensive evaluation $z = w_1 \Sigma$ (similarity with the teaching word)+$w_2$ log (occurrence probability of word sequence)      [Formula 1]

In the formula, the first term shows the evaluation 1, the second term shows the evaluation 2, and $w_1$ and $w_2$ are weightings.

Here, the "similarity with the teaching word" in the formula 1 can be represented by the following formula 2.

"Similarity with the teaching word"=(sum of distances between phonemes)/(number of phonemes of the teaching word)      [Formula 2]

When there is no corresponding phoneme, the distance between phonemes is set to 1.

The "occurrence probability of word sequence" in the formula 1 can be represented by the following formula 3.

"Occurrence probability of word sequence"=[probability at which the beginning of the sentence is followed by the word 1]×[probability at which the word 1 is followed by the word 2]× . . . × [probability at which word $N$ is followed by an end of the sentence]      [Formula 3]

For each word sequence, the discrimination section 4 calculates the comprehensive evaluation (z) of the formula 1. Then, the discrimination section 4 selects a word sequence having the maximum value from among the calculated comprehensive evaluations.

Specifically, the word sequence having the maximum sum of the first evaluation value and the second evaluation value is selected as a recognition result having the maximum likelihood.

B-4. "Acquisition Section"

The acquisition section 5 acquires a new word based on the word sequence selected by the discrimination section 4 (i.e., the word sequence having the maximum sum of the first evaluation value and the second evaluation value). Specifically, the acquisition section 5 acquires the unknown word part constituting the word sequence selected by the discrimination section as a new word (i.e., name)

For example, when the third word sequence of the table 1 is selected, the "betobodoru" is registered as a new word (i.e., name) in a not shown memorization section. This "betobodoru" part is a word not related to the calculation of the first evaluation value. Specifically, the acquisition section 5 acquires the word not related to the calculation of the first evaluation value as a new word (i.e., unknown word).

B-5. "Other Configurations of Lexical Acquisition Apparatus"

For example, in the case of the user's speech of "korega XZY dayo ("This is a XYZ." in English)" including "korega . . . dayo ("This is a . . . " in English)" as a "teaching word" and "XYZ" as an "unknown word", this speech is called a "teaching phrase".

To the lexical acquisition apparatus 1 according to this embodiment, a speech corresponding to the teaching phrase is cut out from the speech of the user and is inputted and processed therein.

A not shown teaching phrase extraction section extracts the teaching phrase from the conversation of the user.

The lexical acquisition apparatus 1 as described above is configured by a computer for example. This computer realizes the above method (i.e., lexical acquisition) by carrying out a lexical acquisition program as software installed in advance. Specifically, by allowing the computer to carry out the lexical acquisition program, the computer functions as the above-described phoneme recognition section 2, word matching section 3, discrimination section 4, acquisition section 5, and teaching phrase extraction section. The program may include or may not include the one for allowing the computer to function as a pre-processing means and a feature extraction means. The program may be downloaded via a communication line or may be stored in a storage medium such as CD-ROM, DVD-ROM, or a mobile storage device.

Another configuration also may be used when a plurality of computers are connected to one another via LAN, the Internet, or a public network for example so that the operations of the phoneme recognition section 2, the word matching section 3, the discrimination section 4, the acquisition section 5, and the teaching phrase extraction section are done by the distributed processing by a plurality of personal computers. Any computer having a conventionally-known configuration can be used. The computer includes a storage device such as RAM, ROM, or a hard disk, an operation apparatus such as a keyboard or a pointing device, a central processing unit (CPU) for processing the data or software stored in the storage device based on an instruction from the operation apparatus for example, and a display for displaying the processing result for example. This computer may be configured as a general-purpose device or an exclusive device.

C. "Operation of Lexical Acquisition Apparatus"

The teaching phrase extraction section inputs, to the lexical acquisition apparatus 1 according to this embodiment, the speech of the user that corresponds to the teaching phrase. This input triggers the processing by the lexical acquisition apparatus 1.

Figure 2:
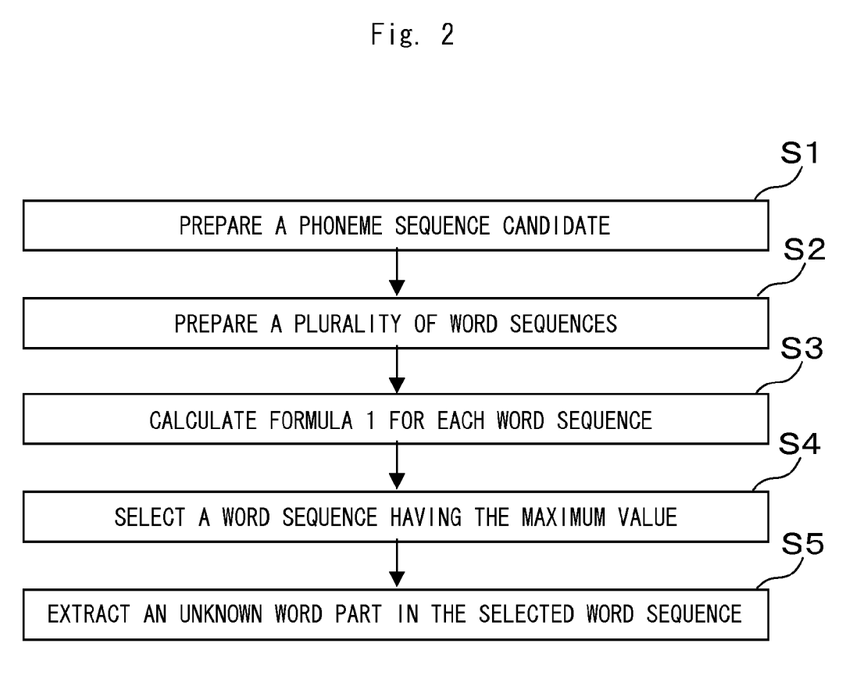
FIG. 2 is a general flowchart for explaining the processing of the lexical acquisition apparatus according to the present embodiment.

As shown in FIG. 2, the lexical acquisition apparatus 1 prepares a phoneme sequence candidate from the inputted speech (Step S1). Based on this phoneme sequence candidate, the lexical acquisition apparatus 1 prepares a plurality of word sequences (Step S2). The lexical acquisition apparatus 1 calculates the formula 1 for each word sequence (Step S3). Here, the lexical acquisition apparatus 1 selects such a word sequence that has the maximum value obtained from the formula 1 (Step S4). Then, the lexical acquisition apparatus 1 extracts an unknown word part in the selected word sequence as a new word.

D. "Effect of Lexical Acquisition Apparatus"

As described above, according to the lexical acquisition apparatus 1 of an embodiment of the present invention, a new name can be learned through natural spoken dialogue.

E. "Multi Dialogue Behavior System According to Other Embodiments"

Figure 3:
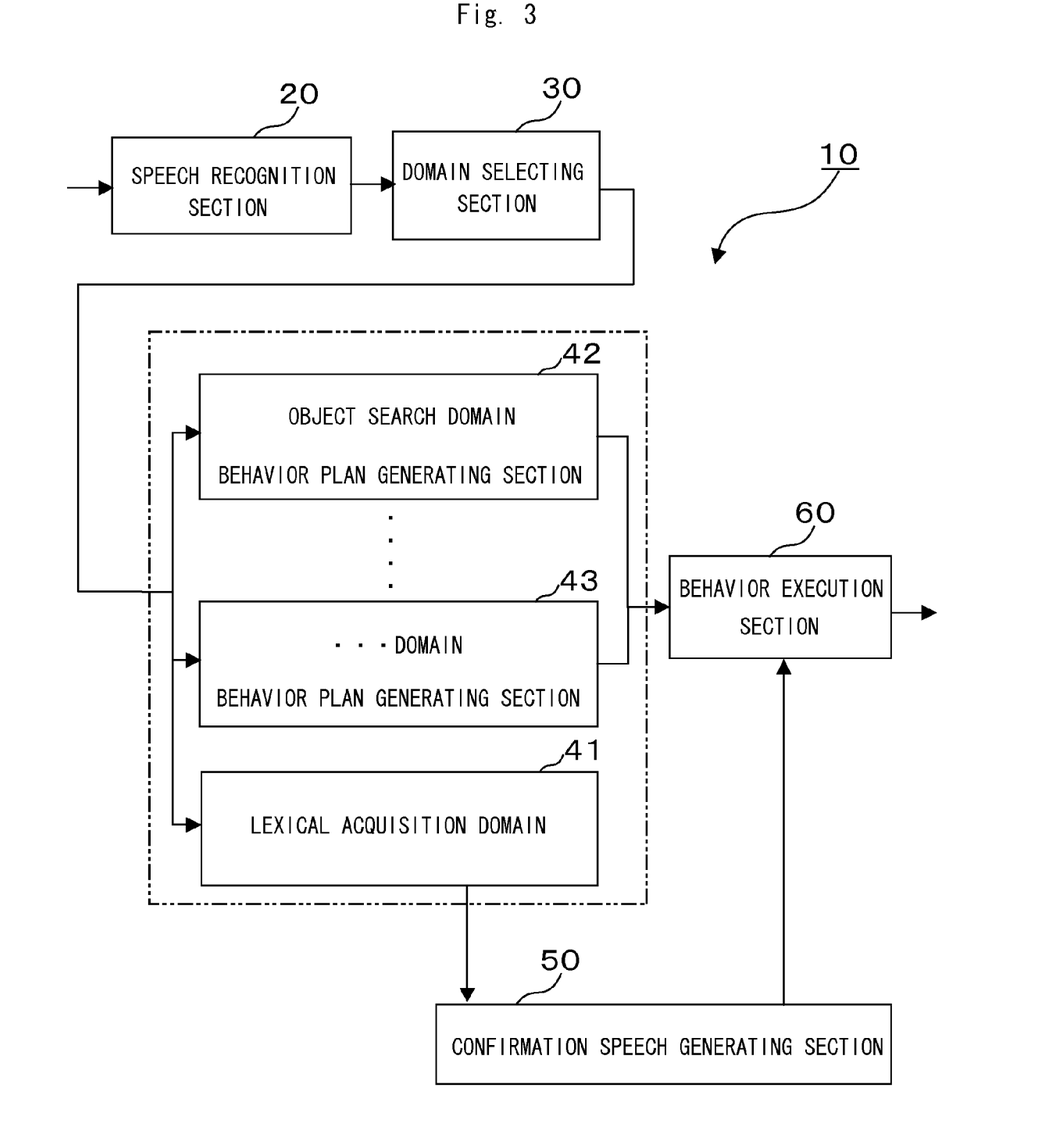
FIG. 3 is a block diagram illustrating a multi dialogue behavior system according to other embodiment of the present invention.

FIG. 3 is a block diagram illustrating the configuration of a multi dialogue behavior system 10 according to other embodiments of the present invention.

This multi dialogue behavior system 10 includes a plurality of functional sections for performing various dialogue behaviors (i.e., a plurality of functional regions). This functional region is called a domain. The multi dialogue behavior system 10 appropriately selects a certain domain among the plurality of domains to perform a desired dialogue behavior.

The multi dialogue behavior system 10 includes, as shown in FIG. 3, a speech recognition section 20, a domain selecting section 30, a plurality of domains 41, 42, and 44, a confirmation speech generating section 50, and a behavior execution section 60.

E-1. "Speech Recognition Section"

The speech recognition section 20 recognizes an inputted speech. Specifically, the speech recognition section 20 prepares a BWG (Bag of Words in a Graph) as a speech recognition result. By using this BWG, the speech recognition section 20 can recognize a topic in a language spoken without any limitation on the words and grammar. The speech recognition section 20 includes a Large Vocabulary Automatic Speech Recognizer (LVASR) and a language model.

Figure 4:
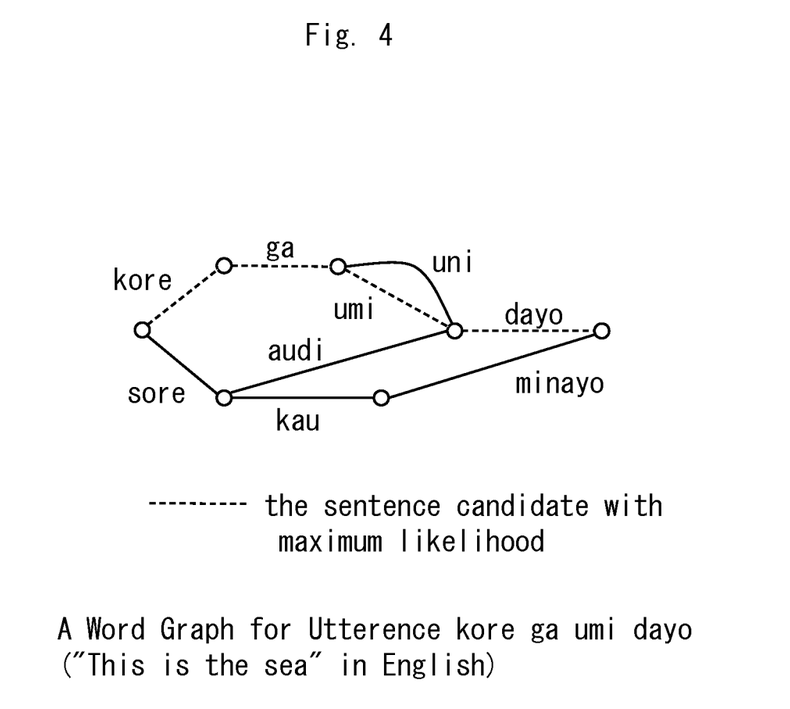
FIG. 4 illustrates an example of BWG prepared by a speech recognition section according to an embodiment of the present invention.

One BWG consists of a set of edges showing recognized words (edge: bar line in the drawing) and a set of vertices showing the points of time (vertex: circles in the drawing). An example of BWG is shown in FIG. 4.

Figure 5:
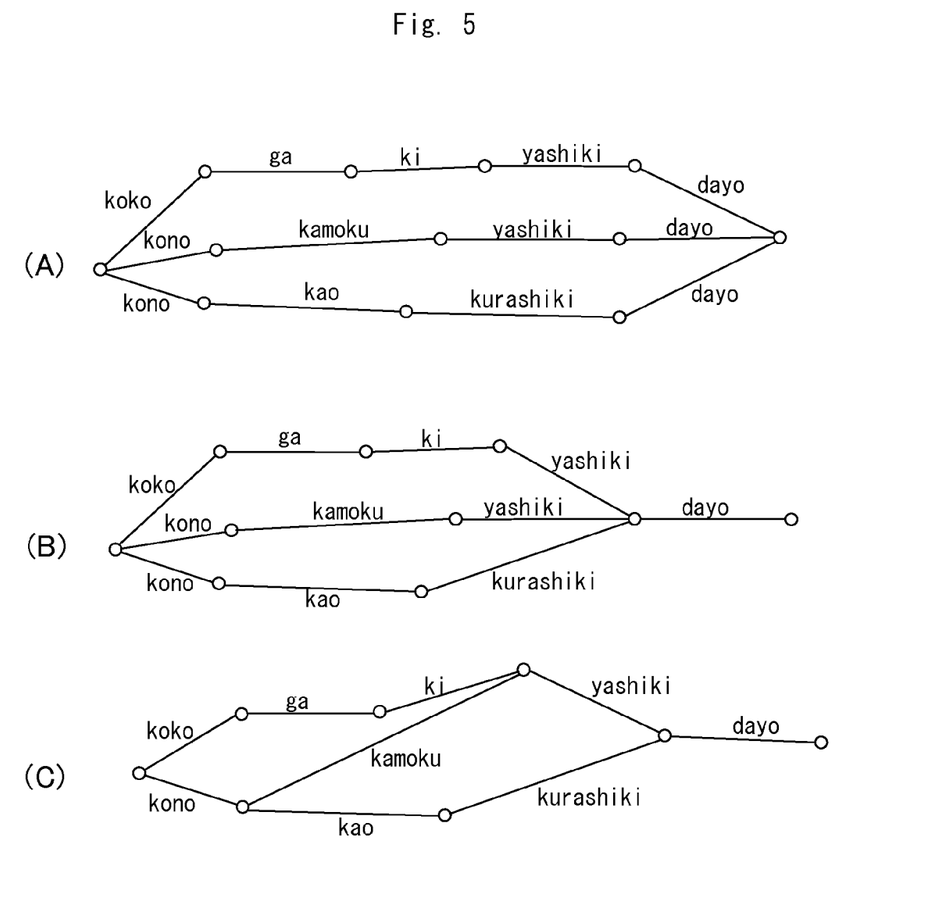
FIG. 5 illustrates a method of preparing BWG in the speech recognition section according to an embodiment of the present invention.

The following section will describe the outline of the method of preparing BWG with reference to FIG. 5.

In order to prepare BW the speech recognition section 20 uses the N-BEST obtained as a speech recognition result. It is assumed that a certain speech recognition result shows the following first to third among the N-BEST.

First: Koko/ga/ki/yashiki/dayo
Second: Kono/kamoku/yashiki/dayo
Third: Kono/kao/kurashiki/dayo Based on the first to third among the N-BEST as described above, a simple graph as shown in FIG. 5(A) is prepared. In FIG. 5(A), the starting point and the end point are commonly used.

Next, as shown in FIG. 5(B), common words [dayo] are collectively replaced with one common arc (i.e., common edge).

The common words are repeatedly collectively replaced to prepare a form shown in FIG. 5(C) (i.e., a form in which common words cannot be replaced any more). This is called BWG E-2. "domain Selecting Section"

The domain selecting section 30 determines which domain is selected based on the speech recognition result by the speech recognition section 20.

Here, the BWG prepared as a speech recognition result (which is called a result BWG) is given to the respective domains 41, 42, and 44. Each of the domains 41, 42, and 44 includes in advance a BWG related to a word requiring the function thereof (hereinafter referred to as a related BWG or a topic classification model). Each of the domains 41, 42, and 44 calculates the similarity between the related BWG thereof and the result BWG. The calculation results by the respective domains 41, 42, and 44 are sent to the domain selecting section 30. Then, the domain selecting section 30 selects the domains 41, 42, and 44 showing a high score value.

The following section will describe the calculation of the similarity between a related BWG and a result BWG.

The processing in each of the respective domains 41, 42, and 44 is composed of a study phase and an execution phase. In the execution phase, the similarity between a related BWG and a result BWG is calculated. The study phase is a pre processing for the execution phase.

First, the following section will describe the study phase of the respective domains 41, 42, and 44.

In the study phase, the respective domains 41, 42, and 44 prepare the above-described related BWG based on a speech for study (hereinafter referred to as a study speech).

It is assumed that the entire study speech is U, a set of topics is C, and a set of study speeches having the topic c is $U_c$.

The respective study speeches $u_j$ classified for each topic (e.g., speeches teaching the names of places) are all recognized by a speech recognition using the large vocabulary statistics language model and the result is obtained in the form of BWG. This BWG is prepared by the above-described method of FIG. 5. Then, a set of all words appearing in the BWG (i.e., a word set $W(u_j)$) is calculated.

Then, the word sets $W(u_j)$ of the respective study speeches $u_j$ are collected. The sum set W of the word sets $W(u_j)$ can be represented by the following formula 4.

$$W = U_j W(u_j) \quad \text{[Formula 4]}$$

Next, the probability $P(c|t_j)$ is calculated at which $u_j \epsilon U_c$ is established when $t_j \epsilon W(u_j)$ is established. In this embodiment, the probability $P(c|t_i)$ is a topic classification model (i.e., a probability showing a related BWG). Specifically, the probability $P(c|t_i)$ shows a probability at which the topic c is the topic $t_i$ regarding the domain thereof. This probability $P(c|t_i)$ can be modified by Bayes' Rule to the following formula 5.

$$P(c|t_i) = \frac{P(t_i|c)P(c)}{P(t_i)} \quad \text{[Formula 5]}$$

In the formula 5, $P(t_i|c)$, $P(t_i)$, and $P(c)$ are estimated as the following formula 6, formula 7, and formula 8.

$$P(t_i|c) = \frac{\left(\begin{array}{c}\text{Number of } u_j \in U_c \text{ for which} \\ t_i \in W(u_j) \text{ is established}\end{array}\right)}{\left(\sum_{u_j} |W(u_j)| \| u_j \in U\right)} \quad \text{[Formula 6]}$$

-continued $$P(t_i) = \frac{\binom{\text{Number of } u_j \in U \text{ for which}}{t_i \in W(u_j) \text{ is established}}}{\left(\sum_{u_j} |W(u_j)| | u_j \in U\right)}$$ [Formula 7]

$$P(c) = \frac{|U_c|}{|U|}$$ [Formula 8]

In the manner as described above, the related BWG included in the domain in advance (i.e., a topic classification model) is prepared. The respective domains 41, 42, and 44 perform a study phase. The domains 41, 42, and 44 include topic classification models for themselves. In order to add a new study speech, the above probability $P(c|t_i)$ (i.e., a topic classification model) is recalculated.

Next, the following section will describe the execution phase in the respective domains 41, 42, and 44.

The probability p(c|u) at which the input speech u has the topic c is calculated by the following formula 9 with regard to all c∈C.

$$P(c \mid u) = \sum_{t_i \in W} P(c \mid t_i) P(t_i \mid c)$$ [Formula 9]

Here, $P(c|t_i)$ uses the topic classification model calculated in the study phase (i.e., a related BWG). $P(t_i|u)$ is $1/|W(u)|$ when $t_j \in W(u_j)$ is established and is 0 when $t_j \in W(u_j)$ is not established.

This probability p(c|u) is calculated in the respective domains 41, 42, and 44 and the calculation results thereof are sent to the domain selecting section 30.

The domain selecting section 30 assumes c at which the probability P(c|u) is maximum as a topic. In other words, the domain selecting section 30 selects a domain from which the maximum value was sent as the probability P(c|u).

The selection of the domains 41, 42, and 44 based on the score value as described above may be considered as the comprehension of the speech contents. Thus, the domain selecting section 30 also functions as a speech comprehension section for comprehending a speech.

E-3. "Domain"

The respective domains 41, 42, and 44 are softwares used for different functions such as the one for generating a behavior plan of the apparatus. For example, domains include the "object search domain" 42 as shown in FIG. 3. This object search domain 43 is a functional section for searching an object indicated by a user.

As one of the functional sections as described above, the multi dialogue behavior system 10 according to this embodiment has the lexical acquisition apparatus 1 of the above-described embodiment as a lexical acquisition domain 41.

The domain selecting section 30 of this embodiment is configured, when the lexical acquisition domain 41 is selected, to cut out, from the speech by the user, a speech part used as a base to prepare the BWG used for the determination of the domain to give this part as a teaching phrase to the lexical acquisition domain 41. Another configuration also may be used where, instead of allowing the domain selecting section 30 to function as a teaching phrase extraction section, another teaching phrase extraction section is provided as another component (e.g., separate independent software).

E-4. "Confirmation Speech Generating Section"

The confirmation speech generating section 50 utters the unknown word extracted by the lexical acquisition domain (i.e., new word confirmation) to the user for confirmation E-5. "Behavior Execution Section"

The behavior execution section 60 performs a processing based on a control from the domains 41, 42, and 44.

For example, when the multi dialogue behavior system 10 includes wheels and a motor as a power source thereof for transportation, the behavior execution section 60 carries out a control to the motor under the control by the domain E-6. "Action of Multi Dialogue Behavior System According to Other Embodiments"

In the multi dialogue behavior system 10 according to this embodiment, the domain selecting section 30 comprehends the contents of the speech by the user. When the domain selecting section 30 determines that the user tries to teach the system the name of an article or the name of a place for example, the domain selecting section 30 activates the lexical acquisition domain 41. Then, the lexical acquisition domain 41 receives a teaching phrase. The lexical acquisition domain 41 performs the processing shown in FIG. 2.

E-7. "Effect of Multi Dialogue Behavior System According to Other Embodiments"

The multi dialogue behavior system 10 according to this embodiment can extract and learn the name of an object for example through a natural spoken dialogue of a user.

F. "Illustrative Embodiment"

The following section will suggest, as an illustrative embodiment, architecture of a robot that learns a new name in a dialogue. The suggested architecture is based on a multi domain dialogue behavior model RIME (Robot Intelligence with Multiple Experts) [Non-Patent Literature 3]. The RIME can perform a complicated interaction by combining a plurality of modules called experts that perform the interaction of specific domains As one of RIME experts, an expert performing a lexical acquisition dialogue can be used so that an acquired name can be also used by other experts, thereby allowing a lexical acquisition to be performed in a multi domain dialogue.

In order to demonstrate the effectiveness of the suggested architecture, a dialogue robot was structured. This robot can learn a name of an object by a dialogue and can move to find the object when receiving an instruction to search the object based on the name F-1. "Task of Suggested Architecture"

A task of the suggested architecture is to allow a robot that performs dialogues of various domains to learn a name of an object in the dialogues with a person. Specifically, it is assumed that there is a lexical acquisition dialogue domain as one domain of the so-called multi domain dialogue. Through the lexical acquisition dialogue, a person teaches, in a natural speech, the robot the name of an object while showing the object to the robot.

The term "natural speech" means not a template-like speech but speeches using various expressions such as "korewa . . . dayo ("This is . . . " in English)" and " . . . wo oboete ("Memorize . . . " in English)".

Domains other than the lexical acquisition dialogue include a domain for comprehending an instructive speech by a person using acquired words to execute it and a domain for answering a speech asking acquired words. An instructive speech using acquired words includes, for example, an instruction for searching an object such as " . . . wa dokoniaru? ("Where is . . . ?" in English)". A question for acquired words includes "kore wa nandesuka? ("What is this?" in English)"

for example. In order to execute these tasks, it is required to correctly acquire a phonological sequence of words during lexical acquisition.

Furthermore, since the robot also has a multi domain dialogue function, the robot also must be able to handle dialogues for other totally different domains. For example, the robot must be able to handle generally-handled dialogue domains such as questions and answers regarding weather information.

Researches handling similar tasks include a research by Holzapfel et al. [Non-Patent Literature 4]. When a robot finds an unknown word (out-of-vocabulary word) in a dialogue, the robot performs a dialogue for studying the word. The research by Holzapfel et al. is different from this illustrative embodiment in that Holzapfel et al. handles only a case where an unknown word appears in a template-like pattern while the present inventors handle a case for teaching a name of an object in a natural speech. Furthermore, the present inventors have an objective of an easy addition of a dialogue domain based on a multi domain dialogue architecture.

F-2. "Lexical Acquisition Dialogue Robot Architecture"

The robot as described in the section F-1 must determine, upon detecting a speech, to what domain the speech belongs.

This can be recognized as an issue of a domain selection in a multi domain dialogue system. Although the present inventors are also based on a general architecture of a multi domain dialogue system, the present inventors use an RIME [Non-Patent Literature 3] among such architectures. The RIME have, as described later, advantages over other multi domain dialogue system architectures that a domain can be changed flexibly in a dialogue and that a domain can be added with reduced limitation.

This section will firstly describe the outline of the RIME and will secondly describe a suggested architecture.

F-2-1. "Multi Expert Model RIME"

The RIME uses a module called an expert that has knowledge specialized in a specific type of subtask and an internal status (this is an expansion of the domain expert [Non-Patent Literature 5] used in the multi domain speech dialogue system [Non-Patent Literature 3]). In the case of a robot that can answer a question regarding weather forecast for example, the robot has an expert for a substask for "comprehending a question regarding weather forecast" and an expert for a subtask for "telling persons weather forecast". Another expert for a subtask for performing a physical behavior of "moving to a specific location" for example also can be used. By sequentially using these experts, a complicated task can be accomplished. For example, a task for explaining a certain object can be carried out by sequentially performing a substask for guiding a person to the object and a substask for verbally explain the object.

Figure 6:
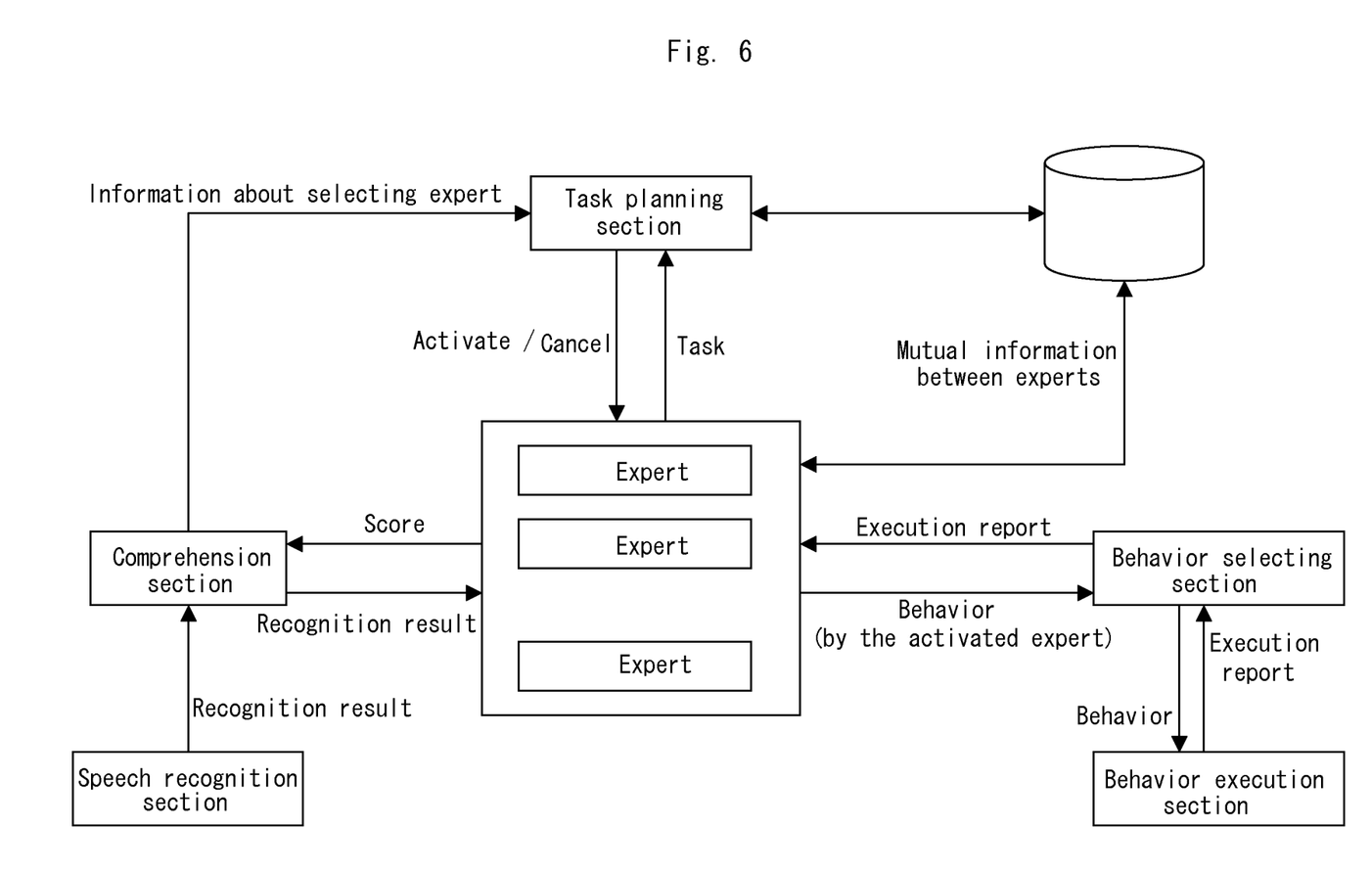
FIG. 6 illustrates a module configuration of RIME according to an illustrative embodiment of the present invention.

In the RIME, a process group (called an adjustment process group) runs in order to use the experts as described above to operate the entire system. FIG. 6 shows the RIME module configuration. There are three adjustment processes that are operated in parallel. A comprehension process performed by a comprehension section sends a speech recognition result to an expert, selects an optimal expert, and sends the information to a task planning process in a task planning section. A behavior selecting process performed by a behavior selecting section requests the selected expert to determine the next operation. In order to accomplish a task or to respond to a speech recognition result, a task planning process determines which expert is to be activated and which expert is to be deactivated. These three processes are operated in parallel in order to handle a speech interrupt The respective experts must have a method for accessing an internal status. An initialize method is called when an expert is prepared and initializes an internal status. An understand method is called from the comprehension process when a speech recognition result is received and updates the information based on the speech recognition result. A select-action method is continuously called from the behavior selecting process and outputs one behavior based on the internal status unless a speech is waited. In addition, a method for handling an interrupt speech is also required.

The understand method produces a return value that is a score of 0 or more and 1 or less representing how much the speech recognition result should be processed by the expert. The comprehension process uses this understand method to send the speech recognition result to a currently-activated expert and an expert having a possibility of being newly activated. Then, the comprehension process selects an expert that has returned the highest score and sends the information thereof to the task planning section. This corresponds to a domain selecting function in the multi domain speech dialogue system.

By only implementing these interfaces, any expert can be introduced regardless of how knowledge and status are internally retained or what kind of algorithm is used to perform comprehension and behavior selection.

Each expert can utilize, via a data storage section called a global context, information that can be commonly used (e.g., a matter included in topics, interest of the user, surrounding situation).

F-2-2. "Outline of Architecture"

Figure 7:
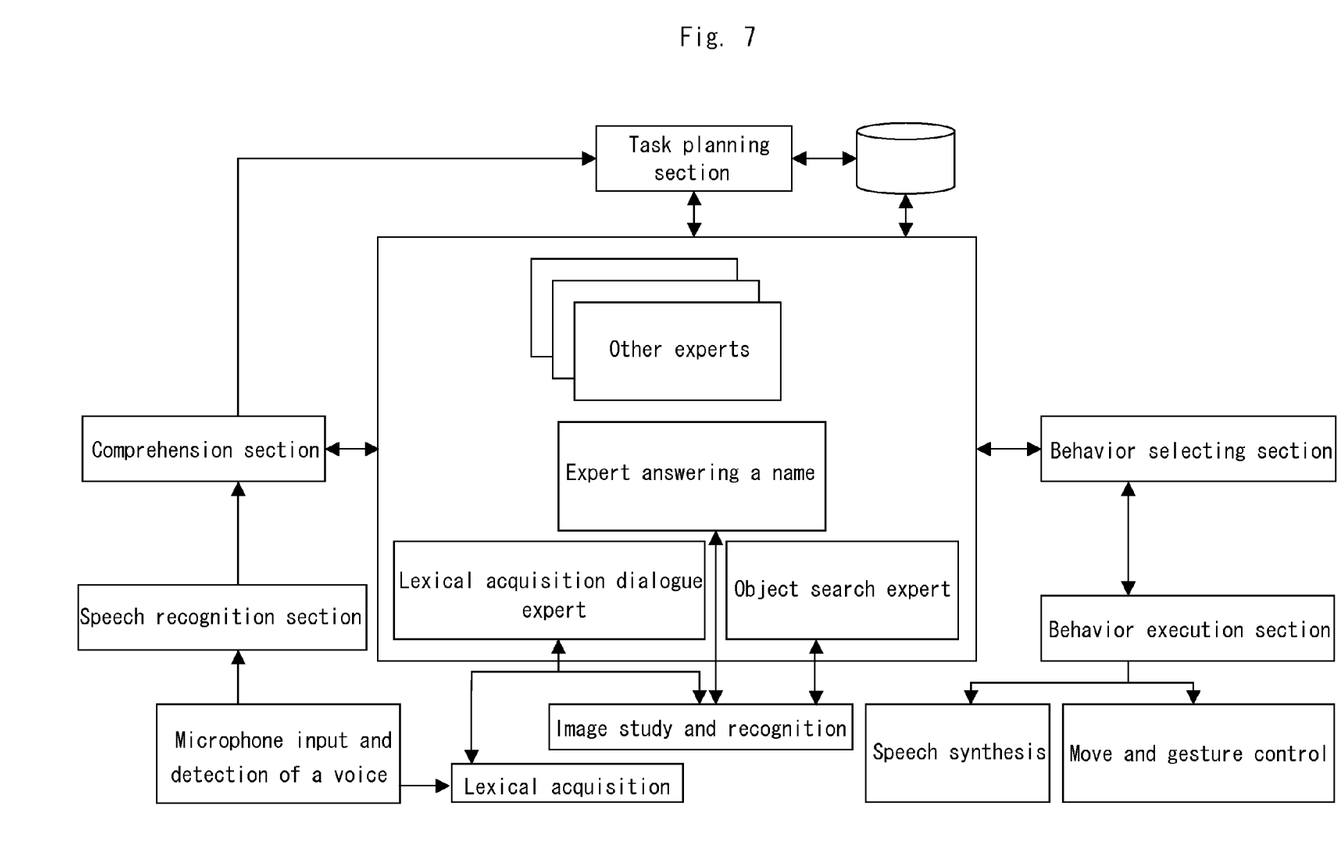
FIG. 7 illustrates the architecture of a lexical acquisition dialogue robot according to an illustrative embodiment of the present invention.

FIG. 7 shows the architecture of a lexical acquisition dialogue robot. An expert is prepared for each task domain. The lexical acquisition expert performs a lexical acquisition dialogue by communicating with a lexical acquisition module and an image study/recognition module. Information for acquired words is stored in the global context so that the information also can be used by other experts. A lexical acquisition dialogue expert sends the information for acquired words via the global context to other experts.

An expert requiring object recognition (i.e., the object search expert and the expert answering a name of an object) optionally communicates with the image study/recognition module.

Since the lexical acquisition module must independently perform speech recognition, a speech after the detection of a voice activity is separated and is sent to both of the speech recognition and lexical acquisition modules of the RIME.

F-2-3. "Expert Selection"

In the RIME, expert selection is performed by using scores returned from the understand methods by the respective experts. This lexical acquisition robot performs speech recognition based on both of a finite state grammar of a sentence pattern owned by each expert and a large vocabulary statistics language model. A recognition result using the large vocabulary statistics language model is used in a speech classification method such as BWG (Bag-of-Words in Graph) [Non-Patent Literature 6]. The result of this speech classification and whether the recognition result using a finite state grammar is covered by the language comprehension grammar are calculated by a score based on the reliability of the recognition result using the finite state grammar and information such as a context.

F-2-4. "Lexical Acquisition Dialogue Expert"

When a speech for teaching a name of an object is inputted and this expert is activated, this expert requires the image study/recognition module to perform an image study. Then, the image study/recognition module determines whether the object it sees is the same as the one memorized in the past or not. When the object it sees is the same as the one memorized in the past, the image study/recognition module returns the ID of the object. When the object it sees is not the same as the one memorized in the past, the image study/recognition module memorizes the feature of the object image and returns the ID of the object. When the image study/recognition module fails to study the object, the module sends a failure flag. When the study is failed, the lexical acquisition dialogue expert tells the user by a speech that the study is failed. If the ID of the object is obtained, the lexical acquisition dialogue expert requests the lexical acquisition module to perform a lexical acquisition. Then, the lexical acquisition module acquires the name using a language model of a teaching speech that is studied in advance and returns the name The lexical acquisition dialogue expert writes the relation between the acquired words and the object ID in a global context and adds the acquired words to the finite state grammar for speech recognition.

F-2-5. "Object Search Expert"

When an object search request is recognized, the object search expert obtains the object ID from the recognition result and sends the object search request to the image study/recognition module and moves the robot through a route specified in advance. The object search searches the object by such a method that is high-speed but that has a low accuracy. If there is a possibility of an existence of the object, the robot is stopped. Then, the expert sends an object recognition request to the image study/recognition module and moves the robot in a direction in which the object may exist with a high probability. If the object is recognized, the search is completed. In the process of this search, the robot uses the name of the acquired object to perform speeches such as " . . . wo sagashi ni ikimasu ("I am going to look for . . . " in English)" and " . . . wo hakken shimashita ("I have found . . . " in English)".

F-2-6. "Expert Answering a Name of an Object"

When a speech for asking a name of an object is recognized, an image study request is sent to the image study/recognition module. When the returned result shows an ID of an object for which the name is already learned, then the name of the object is answered. When the returned result shows an ID of an object for which the name is not learned, the answer is "wakarimasen ("the name is unknown" in English)".

F-3. "Implementation"

A lexical acquisition dialogue robot was structured using the above architecture. It is confirmed that the robot can perform a lexical acquisition, an object search, answering a name, and other dialogues. The following section will describe the details of hardware and software modules used for the implementation.

F-3-1. "Robot"

Figure 8:
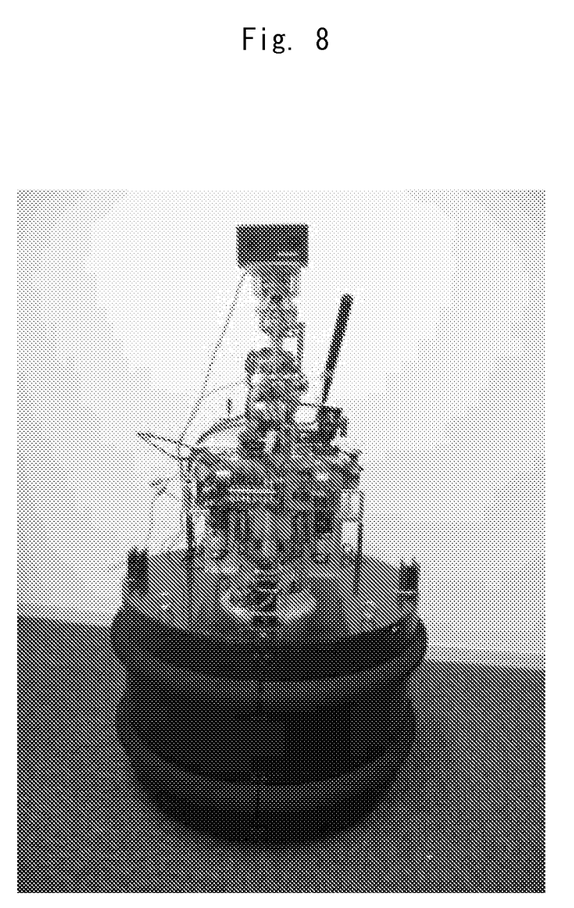
FIG. 8 is a photograph image of a lexical acquisition dialogue robot according to an illustrative embodiment of the present invention.

The robot is an omnidirectional mobile platform robot as shown in FIG. 8. The robot is attached with a directional microphone (SANKEN MICROPHONE, CO., LTD., CS-3e) and a stereo camera (Tokyo Electron Device LTD., TDBD-SCAMv2). The robot performs a speech dialogue processing and an image processing by two PCs installed in the robot. The move of the robot is controlled by a separate server computer that communicates with the robot and the PCs in the robot via wireless LAN. The communication among the modules is easily realized by using the MMI-IF [Non-Patent Literature 7].

F-3-2. "Dialogue Behavior Control"

The dialogue behavior control was structured by an RIME-based tool kit RIMETK [Non-Patent Literature 8]. The speech recognition uses Julius Ver. 4*[1] (*1 http://julius.sourceforgek/) that can decode a speech by a plurality of languages models. An acoustic model and a large vocabulary language model used are those attached to the Julius [Non-Patent Literature 9]. Speech synthesis was realized by FineVoice by NTT IT CORPORATION. Currently, for convenience of implementation, the lexical acquisition dialogue expert and the object search expert are integrated to one expert (lexical acquisition dialogue expert and object search expert). Other experts used include the expert for answering a name of an object, an expert for comprehending a request for weather information, an expert for providing weather information, an expert for comprehending a question for an extension number, and an expert for teaching an extension number.

When a speech is inputted, an expert is selected based on the speech classification result by the BWG method [Non-Patent Literature 6] using the recognition result of the large vocabulary statistics language model and the result of subjecting the recognition result using the finite state grammar to the language comprehension by a Finite-State Transducer (FST). The BWG speech classification classifies a speech to the one for teaching a name, the one for a search request, and other speeches. The understand method of the lexical acquisition dialogue and object search expert returns a fixed score when the speech classification result shows that the speech is the one for teaching a name or the one for a search request.

The expert for answering a name of an object, the expert for comprehending a request for weather information, and the expert for comprehending a question for an extension number retain speech patterns that they can comprehend in the form of FSTs. A finite state grammar similar to these FSTs is used as a speech recognition language model. According to three kinds of information, whether the speech recognition result using the finite state grammar can be comprehended by its own FST, the reliability of the speech recognition result, and whether the expert is already activated or not, the score is calculated based on hand writing rules. The expert for providing weather information and the expert for teaching an extension number are activated only when a task is set by the expert for comprehending a request.

The current rules for calculating an expert selection score are based on trials and errors by the developer. A future challenge is to optimize the score based on data.

F-3-3. "Lexical Acquisition"

There may be various lexical acquisition methods. For example, a method as performed by Holzapfel et al. [Non-Patent Literature 4] for giving sentence patterns in advance, a method as suggested by Yamamoto et al. [Non-Patent Literature 10] for embedding in a statistical language model a statistics model of an unknown word represented by a phonological ngram for example. Giving sentence patterns in advance prevents recognition of sentences having patterns other than those given in advance. The present inventors do not use the statistics model of an unknown word so that any words can be acquired.

In view of the above, the following method is used as a new lexical acquisition method. It is assumed that an individual person has a limited number of speech patterns for teaching a name. Thus, the method suggested by taguchi et al. [Non-Patent Literature 11] is used to study language knowledge from among speech sets for teaching words. Here, parts in a speech that correspond to parts showing matters other than a name of an object are called an expression. The studied language knowledge includes a list of expressions and a bigram of expressions and names. The name part is classified to a class as a class bigram.

When a speech is inputted and a lexical acquisition is requested, the speech is firstly converted by phoneme recognition (phoneme typewriter) to a phoneme sequence. This is performed by a speech recognition system ATRASR [Non-Patent Literature 10] developed by ATR. Next, a two step DP matching [Non-Patent Literature 12] is used to apply the expression to a phoneme sequence using a bigram probability in order to prevent an impossible word sequence from being applied. When an edited distance between the lastly applied expression and the phoneme sequence of the applied part is equal to or lower than a threshold value, the applied part is considered as a name, not an expression. By the method as described above, lexical acquisition is performed.

F-3-4. "Image Study and Recognition"

The image study/recognition module uses the information from a stereo camera to study an image of an object and to search the object. What is firstly difficult when the object is shown to the module to allow the module to study the object is to know which region on the image is an object to be studied, i.e., an issue of object cutting. This issue can be solved by motion attention. The motion attention is that since a person holds an object to show the object to the robot for teaching, the object is assumed to be moved. The robot is given with previous knowledge that a moving part in the image is the object. In other words, the motion in the image is detected and, based on the information for the color of the region and the depth, the final object region is estimated probabilistically. This process requires about 10 fps including stereo calculation.

The object search extracts an object to be recognized in the scene. However, since there is no guarantee that the object is being held by a person, an extraction method paying attention on the motion cannot be used. Thus, for the region extraction during search, a region extraction method by a high-speed active search is used that uses both of a color histogram and depth information.

After the search is successfully performed, the robot approaches the object to finally recognize the object by using a local feature matching using SIFT (Scale Invariant Feature Transform). In this step, color information is used to select candidates to subject the candidates to the matching with the object SIFT information acquired by securing the object during the study in various directions, thereby obtaining the final recognition result G: Others Although the present invention has been described in detail, the present invention can be carried out in various forms within the scope not deviating from the intention.

Values included in the description of an embodiment are merely illustrative. The number of domains shown in FIG. 3 is illustrative and the invention is not limited to the number.

DESCRIPTION OF REFERENCE NUMERALS

1 Lexical acquisition system
2 Phoneme recognition section
3 Word matching section
4 Discrimination section
4A List
4B Probability model
5 Acquisition section
10 Multi dialogue behavior system
20 Speech recognition section
30 Domain selecting section
41, 42, and 44 Domain
50 Confirmation speech generating section
60 Behavior execution section

What is claimed is:

1. A lexical acquisition apparatus, comprising:
one or more of computers for carrying out data processing;
a non-transitory computer readable storage medium having computer executable instructions and data stored therein, the instructions and data being configured such that when the instructions are read and executed, said one or more of the computers function as:
a phoneme recognition section for preparing a phoneme sequence candidate from an inputted speech;
a word matching section for preparing a plurality of word sequences based on the phoneme sequence candidate;
a discrimination section for selecting, from among a plurality of word sequences, a word sequence having a high likelihood in a recognition result; and
an acquisition section for acquiring a new word based on the word sequence selected by the discrimination section,
wherein the storage medium contains a teaching word list listing words that may be uttered by a user as part of the inputted speech to teach a name to the apparatus, and
a probability model of the teaching word and an unknown word,
wherein the discrimination section calculates, for each the word sequence, a first evaluation value indicating how well words in the word sequence correspond to teaching words in the list and a second evaluation value showing a probability at which the words in the word sequence are adjacent to one another in accordance with the probability model, and selects a word sequence for which a sum of the first evaluation value and the second evaluation value is maximum, and
wherein the acquisition section acquires, as a new word, a word in the word sequence selected by the discrimination section that is not involved in the calculation of the first evaluation value.

2. The lexical acquisition apparatus according to claim 1, wherein the instructions and data stored in the storage medium are configured such that when the instructions are read and executed, said one or more of the computers further function as:
a speech recognition section for recognizing the inputted speech, and
a speech comprehension section for comprehending contents of the speech subjected to the speech recognition by the speech recognition section,
wherein when the speech comprehension section recognizes that the speech contents teach a name, a word acquisition processing is performed.

3. The lexical acquisition apparatus according to claim 1 or 2, wherein the instructions and data stored in the storage medium are configured such that when the instructions are read and executed, said one or more of the computers further function as:
a teaching phrase extraction section for cutting, from a user speech, a speech corresponding to a teaching phrase,
wherein the phoneme recognition section prepares the phoneme sequence candidate based on the speech from the teaching phrase extraction section.

4. A multi dialogue behavior system, comprising:
one or more of computers for carrying out data processing;
a non-transitory computer readable storage medium having computer executable instructions and data stored therein, the instructions and data being configured such that when the instructions are read and executed, said one or more of the computers function as:
a speech recognition section for recognizing the inputted speech;

a speech comprehension section for comprehending contents of the speech subjected to the speech recognition by the speech recognition section; and a plurality of functional sections for performing various types of dialogue behaviors based on the speech comprehension result, wherein the functional section includes a lexical acquisition section for performing a word acquisition processing when the speech comprehension section recognizes that the speech contents teach a name, the lexical acquisition section includes:

a phoneme recognition section for preparing a phoneme sequence candidate from an inputted speech, a word matching section for preparing a plurality of word sequences based on the phoneme sequence candidate, a discrimination section for selecting, from among a plurality of word sequences, a word sequence having a high likelihood in a recognition result, and an acquisition section for acquiring a new word based on the word sequence selected by the discrimination section, wherein the medium contains a teaching word list that may be uttered by a user to teach a name to the system, and a probability model of the teaching word and an unknown word, wherein the discrimination section calculates, for each the word sequence, a first evaluation value indicating how well words in the word sequence correspond to teaching words in the list and a second evaluation value showing a probability at which the words in the word sequence are adjacent to one another in accordance with the probability model, and selects a word sequence for which a sum of the first evaluation value and the second evaluation value is maximum, and wherein the acquisition section acquires, as a new word, a word in the word sequence selected by the discrimination section that is not involved in the calculation of the first evaluation value.

5. The multi dialogue behavior system according to claim 4, wherein the instructions and data stored in the storage medium are configured such that when the instructions are read and executed, said one or more of the computers further function as:

a teaching phrase extraction section for cutting, from a user speech, a speech corresponding to a teaching phrase, wherein the phoneme recognition section prepares the phoneme sequence candidate based on the speech from the teaching phrase extraction section.

6. A non-transitory computer readable storage medium having computer executable instructions and data stored therein, the instructions and data being configured such that when the instructions are executed by a computer, the computer functions as:

a phoneme recognition section for preparing a phoneme sequence candidate from an inputted speech, a word matching section for preparing a plurality of word sequences based on the phoneme sequence candidate, a discrimination section for selecting, from among a plurality of word sequences, a word sequence having a high likelihood in a recognition result, and an acquisition section for acquiring a new word based on the word sequence selected by the discrimination section, wherein the discrimination section calculates, for each the word sequence, a first evaluation value indicating how well words in the word sequence correspond to teaching words in a teaching word list that lists words that may be uttered by a user as part of the user's speech to teach a name to the computer and a second evaluation value showing a probability at which the words in the word sequence are adjacent to one another, and selects a word sequence for which a sum of the first evaluation value and the second evaluation value is maximum, and wherein the acquisition section acquires, as a new word, a word in the word sequence selected by the discrimination section that is not involved in the calculation of the first evaluation value.

7. The non-transitory computer readable storage medium according to claim 6, wherein the instructions and data stored in the storage medium are configured such that when the instructions are read and executed by the computer, said computer further functions as:

a speech recognition section for recognizing the inputted speech, and a speech comprehension section for comprehending contents of the speech subjected to the speech recognition by the speech recognition section, when the speech comprehension section recognizes that the speech contents teach a name, a word acquisition processing is performed.

8. The non-transitory computer readable storage medium according to claim 6 or 7, wherein the instructions and data stored in the medium are configured such that when the instructions are read and executed by the computer, said computer further functions as:

a teaching phrase extraction section for cutting, from a user speech, a speech corresponding to a teaching phrase, wherein the phoneme recognition section prepares the phoneme sequence candidate based on the speech from the teaching phrase extraction section.

* * * * *